United States Patent
Boone, Jr. et al.

(10) Patent No.: US 9,245,553 B2
(45) Date of Patent: Jan. 26, 2016

(54) SUBMOUNT-INTEGRATED PHOTODETECTOR FOR MONITORING A LASER FOR A HEAT-ASSISTED MAGNETIC RECORDING HEAD

(71) Applicant: HGST Netherlands B.V., Amsterdam (NL)

(72) Inventors: Thomas Dudley Boone, Jr., San Jose, CA (US); Takuya Matsumoto, Sunnyvale, CA (US); Shen Ren, Union City, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/089,589

(22) Filed: Nov. 25, 2013

(65) Prior Publication Data

US 2015/0146507 A1  May 28, 2015

(51) Int. Cl.
| | | |
|---|---|---|
| *G11B 11/00* | (2006.01) | |
| *G11B 5/48* | (2006.01) | |
| *G11B 5/31* | (2006.01) | |
| G11B 5/00 | (2006.01) | |
| G11B 7/1384 | (2012.01) | |

(52) U.S. Cl.
CPC .............. *G11B 5/4866* (2013.01); *G11B 5/314* (2013.01); *G11B 7/1384* (2013.01); *G11B 2005/001* (2013.01); *G11B 2005/0021* (2013.01)

(58) Field of Classification Search
CPC ...................... G11B 5/4866; G11B 2005/0021; G11B 5/314; G11B 5/6088; G11B 2005/001; G11B 7/1387; G11B 5/3133; G11B 13/08; G11B 7/1384; G11B 7/1206
USPC .......... 369/13.33, 13.32, 13.24, 13.14, 13.03, 369/13.02, 13.12, 13.13, 13.22, 13.01, 369/112.27, 13.17; 360/59, 125.74
See application file for complete search history.

(56) References Cited

U.S. PATENT DOCUMENTS

| | | |
|---|---|---|
| 8,054,571 B2 | 11/2011 | Matsumoto et al. |
| 8,149,653 B2 | 4/2012 | Shimazawa et al. |
| 8,243,561 B2 | 8/2012 | Matsumoto |

(Continued)

OTHER PUBLICATIONS

Baoxi, Xu, "Efficiency Analysis of Near Field Optical Transducer Used in Heat-Assisted Magnetic Recording", IEEEXplore Digital Library, IEEE Transactions on Magnetics, Jul. 2013, pp. 1-2, vol. 49, Issue 7, URL: http://ieeexplore.ieee.org/xpl/login.jsp?tp=&arnumber=6558930&url=http%3A%2F%2Fieeexplore.ieee.org%2Fiel7%2F20%2F6558881%2F06558930.pdf%3Farnumber%3D6558930.

(Continued)

*Primary Examiner* — Ali Neyzari
(74) *Attorney, Agent, or Firm* — John D. Henkhaus

(57) ABSTRACT

In a heat-assisted magnetic recording hard disk drive, a laser module includes a submount-integrated photodetector configured to receive optical energy from a laser by way of a head slider. The submount may be formed of a semiconductor material such as a crystalline silicon material, and the photodetector may be a photodiode that is integrally formed with the submount. A HAMR head slider may comprise a feedback waveguide configured to guide optical energy from the laser through the slider to a feedback photodiode at an interface of the submount and the slider, to detect the optical energy transmitted through the slider to the slider air bearing surface (ABS). A back facet photodiode may also be integrally formed with the submount and configured to receive back facet optical energy to detect the optical energy generated by the laser.

20 Claims, 3 Drawing Sheets

(56) References Cited

U.S. PATENT DOCUMENTS

| | | | |
|---|---|---|---|
| 8,284,635 B2 * | 10/2012 | Matsumoto | 369/13.33 |
| 8,339,905 B2 | 12/2012 | Rausch et al. | |
| 8,341,825 B2 | 1/2013 | Hara et al. | |
| 8,351,151 B2 * | 1/2013 | Katine et al. | 360/110 |
| 8,369,191 B2 | 2/2013 | Shimazawa | |
| 8,391,107 B2 | 3/2013 | Gage et al. | |
| 8,406,090 B2 | 3/2013 | Juang et al. | |
| 8,441,895 B2 | 5/2013 | Shimazawa et al. | |
| 8,509,036 B2 * | 8/2013 | Shimazawa et al. | 369/13.13 |
| 8,923,101 B1 * | 12/2014 | Tatah et al. | 369/13.33 |
| 2009/0185459 A1 | 7/2009 | Matsumoto | |
| 2012/0092971 A1 | 4/2012 | Schreck et al. | |
| 2012/0163137 A1 | 6/2012 | Wang et al. | |
| 2014/0269233 A1 * | 9/2014 | Hara et al. | 369/13.17 |
| 2014/0269236 A1 * | 9/2014 | Kozlovsky et al. | 369/13.24 |

OTHER PUBLICATIONS

Combined Search and Examination Report under Sections 17 and 18(3), May 1, 2015, 6 pages, Patents Directorate, Intellectual Property Office.

* cited by examiner

SUBMOUNT-INTEGRATED PHOTODETECTOR FOR MONITORING A LASER FOR A HEAT-ASSISTED MAGNETIC RECORDING HEAD

FIELD OF EMBODIMENTS OF THE INVENTION

Embodiments of the invention relate generally to hard disk drives and more particularly to detecting the performance of a laser associated with a heat-assisted magnetic recording head.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk.

Increasing areal density (a measure of the quantity of information bits that can be stored on a given area of disk surface) is one of the ever-present holy grails of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat-assisted magnetic recording (HAMR) [which may also be referred to as energy-assisted magnetic recording (EAMR) or thermal-assisted magnetic recording (TAR)] is a known technology that magnetically records data on high-stability media using, for example, laser thermal assistance to first heat the media material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature above the Curie temperature, at which the medium effectively loses coercivity and a realistically achievable magnetic write field can write data to the medium.

One approach to HAMR designs is to utilize a semiconductor laser system to heat the media to lower its coercivity, whereby the optical energy is transported from the laser to the slider ABS via a waveguide and is concentrated to a nanometer-sized spot utilizing a near field transducer (NFT). More detailed information about the structure and functionality of a thermally assisted magnetic write head employing an NFT can be found in U.S. Pat. No. 8,351,151 to Katine et al., the disclosure of which is incorporated by reference in its entirety for all purposes as if fully set forth herein.

The performance of a HAMR system is largely affected by the precision with which the components within the HAMR system are aligned. For example, a minuscule amount of structural misalignment between a laser diode, which is typically a separate component from but coupled to a head slider, and a corresponding waveguide, which is formed on or within the head slider, can be the cause of significant performance degradation to the HAMR system. Therefore, precise alignment of components within a HAMR system is desirable for optimal tuning and performance of such a system.

SUMMARY OF EMBODIMENTS OF THE INVENTION

Embodiments of the invention are directed towards a laser module configured for use in a heat-assisted magnetic recording (HAMR) head slider, to a HAMR head slider assembly comprising a laser module, and to a hard disk drive comprising a HAMR head slider assembly comprising a laser module, where the laser module comprises a submount-integrated photodetector configured to receive optical energy from a laser by way of a head slider.

According to embodiments, the submount is formed of a semiconductor material, for a non-limiting example, a crystalline silicon material, and the photodetector is a photodiode that is integrally formed with the submount. A circuit is provided to transmit from the photodetector a signal from which the optical energy transmitted through a slider can be computed.

According to embodiments, a HAMR head slider comprises a feedback waveguide configured to guide optical energy from a laser through the slider to a feedback photodiode at an interface of the submount and the slider, to detect the amount of optical energy that is transmitted through the slider to the slider air bearing surface (ABS). Embodiments may also include a back facet photodiode integrally-formed with the submount and configured to receive back facet optical energy to detect the amount of optical energy generated, or emitted, by the laser. Thus, the amount of energy emitted from the laser source can be compared with the amount that is transmitted through the slider to the ABS for HAMR purposes.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a submount-integrated photodetector for monitoring the laser power for a heat-assisted magnetic recording head, for use in a hard disk drive for example, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments

Figure 1:
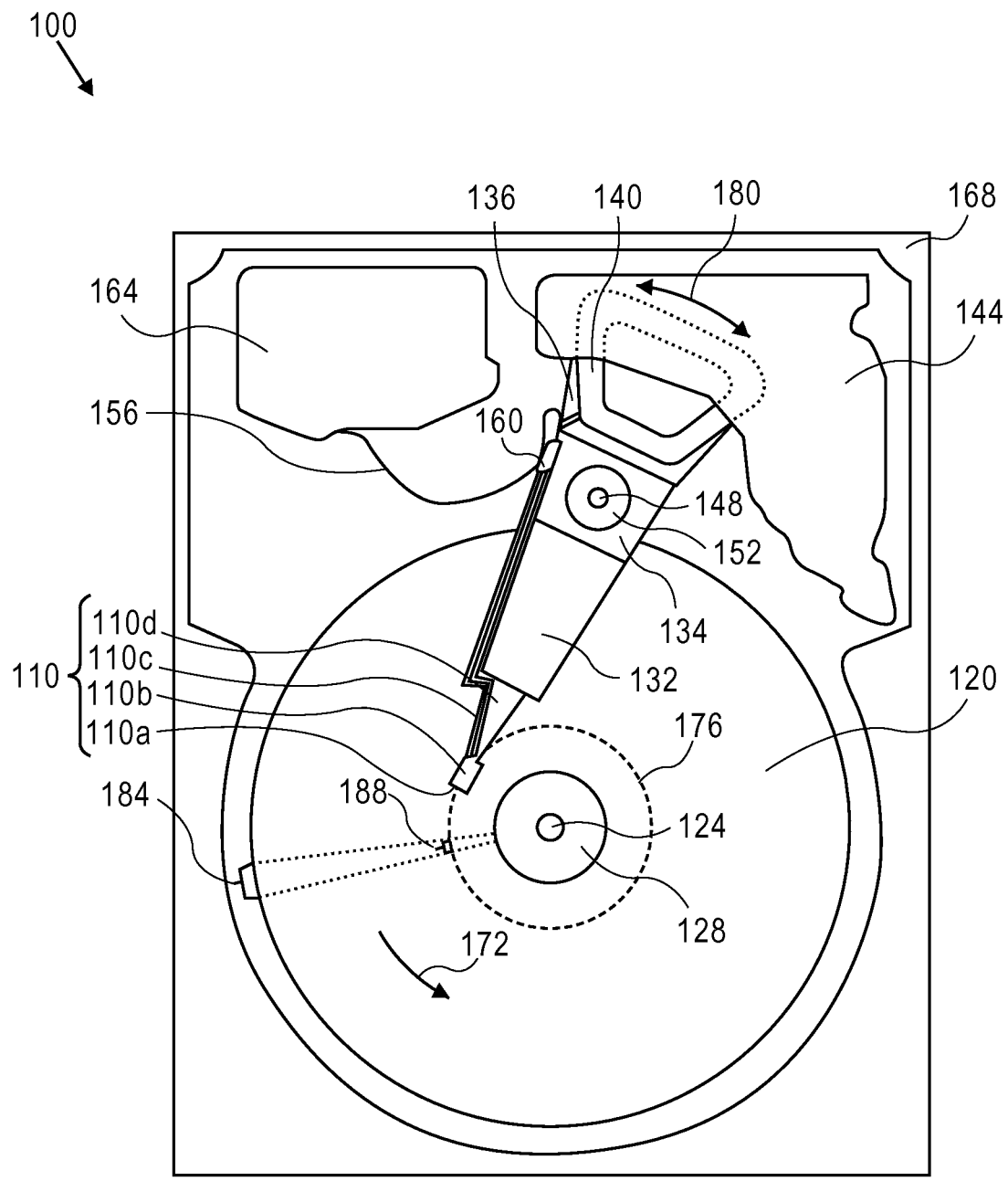
FIG. 1 is a plan view illustrating a hard disk drive (HDD), according to an embodiment of the invention.

Embodiments of the invention may be used in the context of a magnetic writer for a hard-disk drive (HDD). In accordance with an embodiment of the invention, a plan view illustrating an HDD 100 is shown in FIG. 1. FIG. 1 illustrates the functional arrangement of components of the HDD including a slider 110b that includes a magnetic-reading/ recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not shown) attached to the spindle 124 for rotating the media 120. The head 110a includes a write element and a read element for respectively writing and reading information stored on the media 120 of the HDD 100. The media 120 or a plurality (not shown) of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks (not shown) arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Introduction

With HAMR, a laser diode needs to be integrated onto a more traditional magnetic recording head. A significant challenge for this technology is that the laser diode be accurately aligned to a single mode waveguide fabricated on the recording head slider. Additionally, the optical power emitted by the laser must maintain stability during operation over a wide range of temperatures and environmental conditions. These challenges require extremely accurate monitoring and feedback of the laser diode optical power.

Heat-Assisted Magnetic Recording Laser Module with Feedback Photodetector

Figure 2:
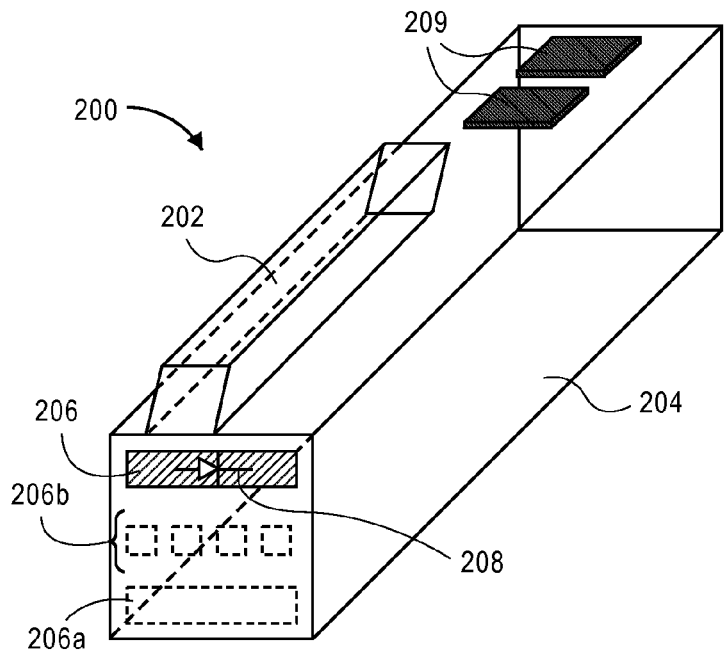
FIG. 2 is perspective view illustrating a laser module having a submount-integrated photodetector for use with a heat-assisted magnetic recording (HAMR) head, according to an embodiment of the invention.

FIG. 2 is perspective view illustrating a laser module having a submount-integrated photodetector for use with a heat-assisted magnetic recording (HAMR) head, according to an embodiment of the invention. With reference to FIG. 2, a HAMR-based laser module 200 is described, which may be implemented with a hard disk drive HAMR head such as head 110a (FIG. 1).

In view of the laser module 200 being described for possible use with a HAMR head, the laser module 200 comprises an optical light source, such as a laser 202, which is coupled with or integrally-formed with a submount 204, for mounting to a HAMR head slider and utilized for locally heating magnetic media 120 (FIG. 1). For example, a plasmonic heating device such as a near-field transducer (NFT) may be implemented for concentrating the optical energy from the laser 202, such as a semiconductor laser, to a nanometer-sized spot to locally heat the magnetic media 120 in a region typically just upstream from a write pole. For a non-limiting example, a HAMR laser module such as laser module 200 may be mounted on or near the backside (opposite the air bearing surface, or ABS) of a HAMR head slider (see, e.g., FIG. 4). Further, and as described in reference to FIG. 4, a HAMR heating assembly may comprise a waveguide to guide, transmit or carry the optical energy from the laser 202 to the ABS to illuminate the NFT.

This localized heating of the magnetic media 120 (FIG. 1) momentarily reduces the local coercivity of the magnetic media 120, which greatly facilitates writing to a magnetic media 120 which has an otherwise too high coercivity to be written to. In order for the heating assembly to function effectively, it should be located as close as possible to the write pole. In addition, the heating assembly should heat only a very small area on the media in order to avoid demagnetizing adjacent tracks of data or downstream data on the same track.

Laser diodes are fragile and not suitable for direct mechanical attachment to the recording head slider. Therefore, a submount assembly may be used to mount the laser diode to the slider body. Typically, hard workable materials such AlN have been used to create submounts for mechanical integration of laser diodes into subsystems. However, considering the alignment accuracy needs of HAMR, very smooth surfaces on the submount are desirable to reduce any positional inaccuracies due to surface roughness when joining the submount to the laser or to the slider body. In part to achieve this desired surface smoothness the submount 204 is fabricated with semiconductor material, according to an embodiment. For example and according to an embodiment, the submount 204 is fabricated in crystalline silicon.

With further reference to FIG. 2, laser module 200 further comprises a photodetector entrance aperture, aperture 206, which facilitates the reception of optical energy by a photodetector 208. The photodetector 208 is configured for and utilized to receive optical energy from the laser 202 by way of the head slider, the facilitating configuration of which is described in more detail in reference to FIG. 4. For purposes of an example, aperture 206 is depicted in FIG. 2 at a certain area of a face of submount 204, such as at an interface between submount 204 and a corresponding HAMR head slider (see, e.g., FIG. 4). However, the position of aperture 206 on the face of submount 204 may vary from implementation to implementation. For example, the aperture may be positioned at an alternate location depicted with dashed lines as aperture 206a, or at a location between what is shown for aperture 206 and aperture 206a. Furthermore, and according to an embodiment, the aperture may be configured as an array of apertures such as depicted with dashed lines as aperture array 206b. An aperture array 206b facilitates the implementation and use of an embodiment having a photodetector array instead of use of a single photodetector 208. Use of a photodetector array may provide a finer degree of resolution in comparison with a single photodetector and, therefore, assist in laser alignment operations for example.

According to an embodiment, it is noteworthy that the photodetector 208 is integrally-formed with the submount 204, thus providing a single device that operates as a mechanical support for the laser 202 as well as providing for monitoring the feedback of the optical power through the photonic integrated circuit of the HAMR heating assembly. According to an embodiment, the photodetector 208 that is integrally formed with the submount 204 is a semiconductor photodiode, such as a PIN photodiode, developed in silicon technology. As discussed the submount 204 may be fabricated with semiconductor material, such as crystalline silicon. As such, integrally forming a semiconductor photodiode for the photodetector 208 along with a semiconductor material for the submount 204 is well suited to the use of silicon semiconductor wafer micro-fabrication techniques. Further, according to an embodiment the laser 202 is a semiconductor laser, such as a laser diode.

With further reference to FIG. 2, laser module 200 further comprises electrical contact pads 209 corresponding to the photodetector 208, and coupled to the submount 204. The contact pads 209 are configured to transmit, from electrical leads from the photodetector 208, a feedback signal that characterizes, or from which may be computed, the amount of optical energy transmitted through the head slider.

Heat-Assisted Magnetic Recording Laser Module with Back Facet Photodetector

Figure 3:
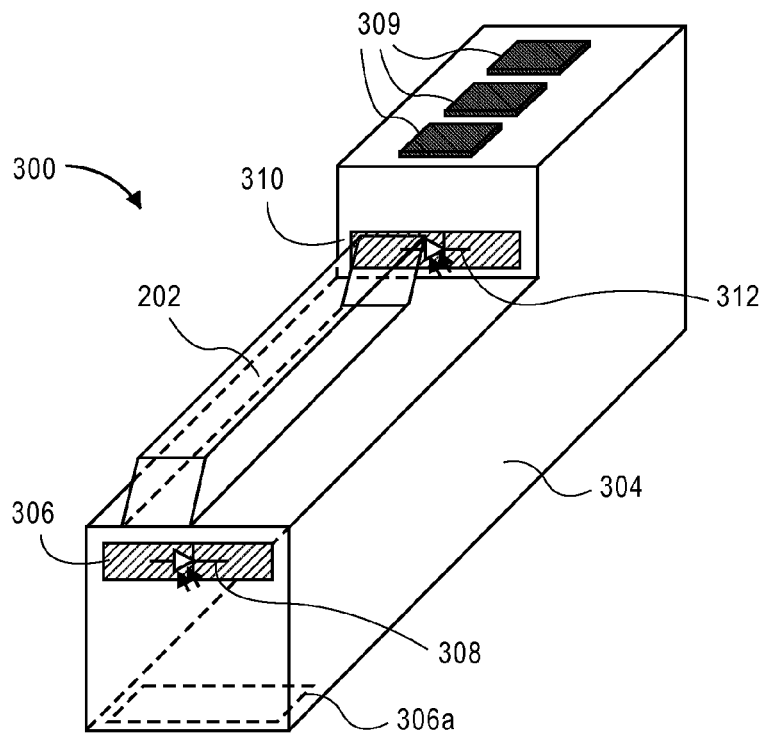
FIG. 3 is perspective view illustrating a laser module having a submount-integrated photodetector for use with a HAMR head, according to an embodiment of the invention.

FIG. 3 is perspective view illustrating a laser module having a submount-integrated photodetector for use with a HAMR head, according to an embodiment of the invention. With reference to FIG. 3, a HAMR-based laser module 300 is described, which may be implemented with a hard disk drive HAMR head such as head 110a (FIG. 1).

In view of the laser module 300 being described for possible use with a HAMR head, the laser module 300 comprises an optical light source, such as a laser 202, which is coupled with a submount 304, for mounting to a HAMR head slider and utilized for locally heating magnetic media 120 (FIG. 1). For example, a plasmonic heating device such as a near-field transducer (NFT) may be implemented for concentrating the optical energy from the laser 202, such as a semiconductor laser, to a nanometer-sized spot to locally heat the magnetic media 120 in a region typically just upstream from a write pole. For a non-limiting example, a HAMR laser module such as laser module 300 may be mounted on or near the backside (opposite the air bearing surface, or ABS) of a HAMR head slider (see, e.g., FIG. 4). Further, and as described in reference to FIG. 4, a HAMR heating assembly may comprise a waveguide to guide, transmit or carry the optical energy from the laser 202 to the ABS to illuminate the NFT.

As discussed, considering the alignment accuracy needs of HAMR, very smooth surfaces on the submount are desirable to reduce any positional inaccuracies due to surface roughness when joining the submount to the laser or to the slider body. In part to achieve this desired surface smoothness the submount 304 is fabricated with semiconductor material, according to an embodiment. For example and according to an embodiment, the submount 304 is fabricated in crystalline silicon.

With further reference to FIG. 3, laser module 300 further comprises a photodetector entrance aperture, aperture 306, which facilitates the reception of optical energy by a photodetector 308. The photodetector 308 is configured for and utilized to receive optical energy from the laser 202 by way of the head slider, the facilitating configuration of which is described in more detail in reference to FIG. 4. For purposes of an example, aperture 306 is depicted in FIG. 3 at a certain area of a face of submount 304, such as at an interface between submount 304 and a corresponding HAMR head slider (see, e.g., FIG. 4). However, the position of aperture 306 on the face of submount 304 may vary from implementation to implementation. For example, the aperture may be positioned at an alternate location depicted in FIG. 2 with dashed lines as aperture 206a, or at a location between what is shown in FIG. 2 for aperture 206 and aperture 206a. Furthermore, and according to an embodiment, the aperture may be positioned on other faces of submount 304, such as the face of submount 304 opposing the laser 202, depicted as aperture 306a in FIG. 3. Note that the alternate location depicted as aperture 306a is also applicable to aperture 206 of laser module 200 (FIG. 2), but is not depicted in FIG. 2 for purposes of clarity. Still further, and according to an embodiment, the aperture may be configured as an array of apertures such as depicted in FIG. 2 with dashed lines as aperture array 206b. An aperture array 206b facilitates the implementation and use of an embodiment having a photodetector array instead of use of a single photodetector 308.

According to an embodiment, it is noteworthy that the photodetector 308 is integrally-formed with the submount 304, thus providing a single device that operates as a mechanical support for the laser 202 as well as providing for monitoring the feedback of the optical power through the photonic integrated circuit of the HAMR heating assembly. According to an embodiment, the photodetector 308 that is integrally formed with the submount 304 is a semiconductor photodiode, such as a PIN photodiode, developed in silicon technology. As discussed the submount 304 may be fabricated with semiconductor material, such as crystalline silicon. As such, integrally forming a semiconductor photodiode for the photodetector 308 along with a semiconductor material for the submount 304 is well suited to the use of silicon semiconductor wafer micro-fabrication techniques. Further, according to an embodiment the laser 202 is a semiconductor laser, such as a laser diode.

Laser module 300 further comprises electrical contact pads 309 corresponding to the photodetector 308, and coupled to the submount 304. The contact pads 309 are configured to transmit, from electrical leads from the photodetector 308, a feedback signal that characterizes, or from which may be computed, the amount of optical energy transmitted through the head slider.

With further reference to FIG. 3, laser module 300 further comprises a photodetector entrance aperture, aperture 310, which facilitates the reception of optical energy by a back facet photodetector 312. The aperture 310 is located on a face of submount 304, where the face is substantially normal to the long axis of the laser 202. A photodetector such as a photodiode is useful for monitoring the light output on the rear or back facet of the laser, as the current from the photodiode changes with variations in light output and provides feedback to adjust the laser drive current. The optical energy emitted out of the back facet of the laser 202 is typically considerably less than that emitted out of the front facet of the laser 202, however, the back facet energy is proportional to the front facet energy. Thus, the photodetector 312 is configured for and utilized to receive back facet optical energy from the laser 202, which can be used to detect and evaluate the amount of optical energy being generated by the laser 202. Laser module 300 further comprises electrical contact pads 309 corresponding to the photodetector 312, and coupled to the submount 304. The contact pads 309 are configured to transmit, from electrical leads from the photodetector 312, a signal that characterizes, or from which may be computed, the amount of optical energy generated by laser 202. For laser module 300, three contact pads 309 are depicted as associated with the two photodetectors 308 and 312, with one of the contact pads 309 being shared by both photodetectors 308 and 312 as a ground. However, the number of contact pads utilized may vary from implementation to implementation.

Therefore, with a laser module 300, the source optical energy emitted from laser 202 can be computed based on the back facet energy detected by the back facet photodetector 312. Further, the amount of optical energy coupled into the slider and reaching the slider ABS can be computed based on the optical energy detected by the feedback photodetector 308. From the foregoing source optical energy and amount reaching the ABS, the performance of the laser 202 (e.g., the loss, or efficiency, of the laser 202), and the performance of a HAMR head heating assembly generally, is computable.

According to an embodiment, it is noteworthy that the photodetector 312 is integrally-formed with the submount 304, thus providing a single device that operates as a mechanical support for the laser 202 as well as providing for monitoring the optical power generated by laser 202. According to an embodiment, the photodetector 312 that is integrally formed with the submount 304 is a semiconductor photodiode, such as a PIN photodiode, developed in silicon technology. As discussed the submount 304 may be fabricated with semiconductor material, such as crystalline silicon. As such, integrally forming a semiconductor photodiode for the photodetector 312 along with a semiconductor material for the submount 304 is well suited to the use of silicon semiconductor wafer micro-fabrication techniques.

Heat-Assisted Magnetic Recording Head Slider

Figure 4:
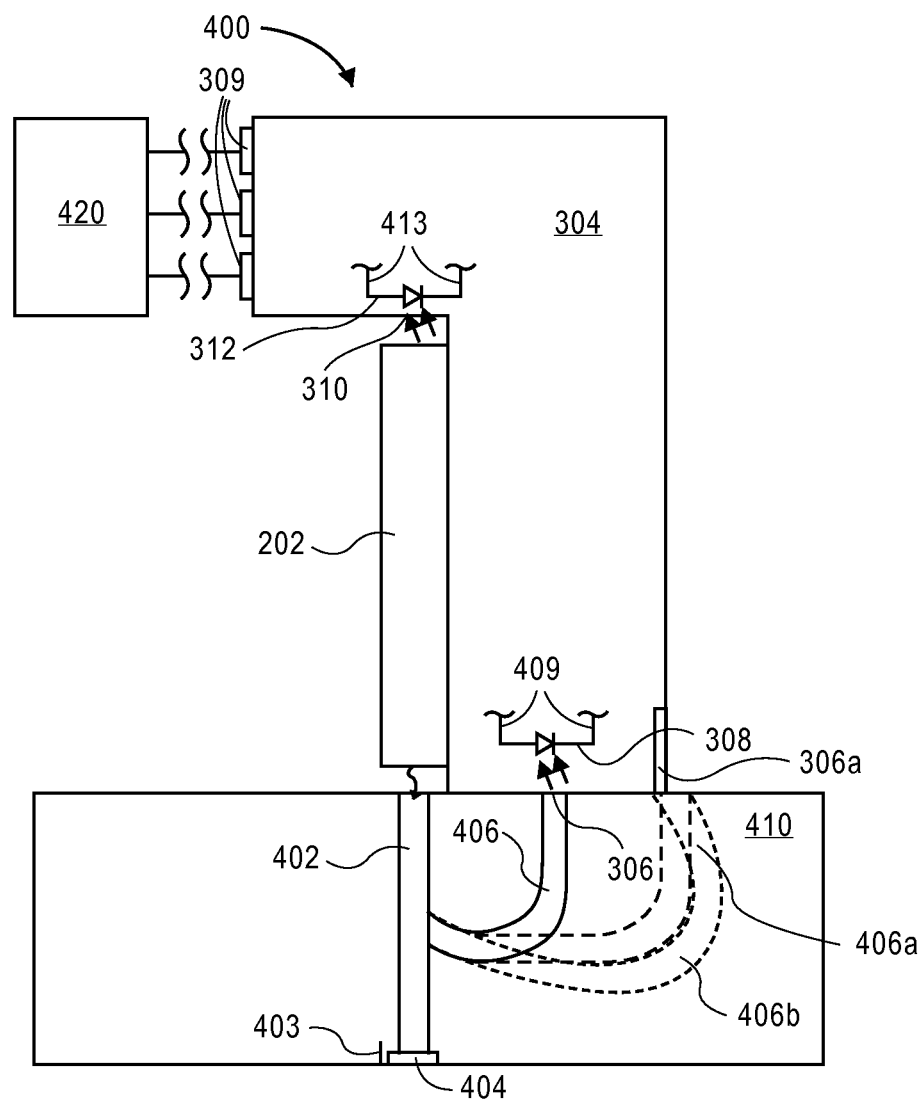
FIG. 4 is a side view illustrating a HAMR head slider coupled with a laser module, according to an embodiment of the invention.

FIG. 4 is a side view illustrating a HAMR head slider coupled with a laser module, according to an embodiment of the invention. With reference to FIG. 4, a HAMR head slider assembly 400 is described, which may be implemented into a hard disk drive such as HDD 100 (FIG. 1). HAMR head slider assembly 400 comprises a laser module assembly such as laser module 300 (FIG. 3), coupled with a HAMR head slider 410.

As depicted in FIG. 4 and similar to laser module 300, the laser module assembly comprises the laser 202 coupled with submount 304, feedback aperture 306 corresponding to feedback photodetector 308, back facet aperture 310 corresponding to back facet photodetector 312, contact pads 309, as well as electrical leads 409 corresponding to feedback photodetector 308 and electrical leads 413 corresponding to back facet photodetector 312, each of these electrical leads 409 and 413 leading to respective electrical contact pads 309.

According to an embodiment, HAMR head slider 410 comprises a HAMR waveguide 402 configured to guide optical energy from the laser 202 through the HAMR head slider 410 to a near-field transducer (NFT) 404 configured near a write head 403. For a non-limiting example, the NFT 404 may utilize a metal optical device such as an E-antenna (or a triangular antenna) which, when illuminated by light, excites a charge oscillation called a plasmon within the antenna. The charges concentrated at the edge of the antenna generate a localized higher intensity optical near-field. The optical near-field is electromagnetically coupled to the magnetic media locally creating a high frequency current. The resistive losses associated with this current are converted to heat, raising the local temperature in the media.

With further reference to FIG. 4, HAMR head slider 410 comprises a feedback waveguide 406 configured to guide a sampling of the optical energy from the laser 202 through the HAMR head slider 410 to the photodetector 308 via the aperture 306 on submount 304, where the photodetector 308 is formed at or near the interface between the HAMR head slider 410 and the submount 304. The submount, 204, 304 with integrally formed photodetector 208, 308, respectively, is configured with appropriate dimensions and coordinates such that when properly aligned the laser 202 is optimally aligned to the slider 410 integrated HAMR waveguide 402 while concurrently each entrance aperture 206, 306 of the photodetector 208, 308, respectively, is adequately aligned to the exit aperture of the slider 410 feedback waveguide 406. In the case of aligning the entrance aperture 206, 306 with the exit aperture of the feedback waveguide 406, the entrance aperture 206, 306 may be configured with a relatively large aperture compared to the feedback waveguide 406 exit aperture, thereby providing a relaxed alignment tolerance as compared to the alignment of the laser 202 to the HAMR waveguide 402.

According to an embodiment in which the aperture 306a is positioned on the face of submount 304 opposing the laser 202, the feedback waveguide is formed to radiate optical energy from the laser 202 through the HAMR head slider 410 and aperture 306a to a photodetector such as photodetector 308 located beyond the aperture 306a. These alternative feedback waveguide arrangements are depicted in FIG. 4 with dashed lines as feedback waveguide 406a and feedback waveguide 406b, one or the other of which may be implemented in place of feedback waveguide 406.

As discussed, with a laser module 300 coupled with a HAMR head slider 410, the source optical energy generated and emitted from laser 202 can be computed based on the back facet energy detected by the back facet photodetector 312. Further, the amount of optical energy coupled into the slider and reaching the slider ABS can be computed based on the optical energy detected by the feedback photodetector 308. From the foregoing source optical energy and amount reaching the ABS, the performance of the laser 202 (e.g., the loss, or efficiency, of the laser 202), and the performance of a HAMR head heating assembly generally, is computable. The computations are computable by a controller 420 based on some form of logic, such as firmware, software, and/or hardware. Generally, the logic comprises one or more sequences of instructions which, when executed by one or more processors, causes performance of computational steps or processes. Controller 420 may be implemented within an HDD comprising a HAMR head slider assembly 400 and/or a laser module 300 (FIG. 3) or laser module 200 (FIG. 2).

Computation of the energy generated by the laser 202 and the energy coupled into and reaching the slider 410 ABS is useful for alignment purposes during manufacturing of a HAMR head slider such as HAMR head slider assembly 400. Stated otherwise, computing the efficiency, or performance, of the photonic integrated circuit of the HAMR heating assembly (e.g., the laser 202, HAMR waveguide 402, NFT 404) provides insight as to how well the components, such as the laser 202 and HAMR waveguide 402, are aligned. Furthermore, computation of the energy generated by the laser 202 and the energy coupled into and reaching the slider 410 ABS is useful, for non-limiting examples, for performance monitoring and laser driving purposes during operation of the laser 202 and the HAMR heating assembly generally, as well as over the life cycle of these components.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A laser module configured for use with a heat-assisted magnetic recording (HAMR) head slider, said laser module comprising:
   a laser, and
   a submount with which said laser is coupled, said submount comprising:
      an aperture positioned on a face of said submount, and
      an integrally-formed photodetector positioned to receive optical energy from said laser which is guided through said head slider and through said aperture.

2. The laser module of claim 1, wherein said photodetector is a semiconductor photodiode integrally formed with said submount.

3. The laser module of claim 1, wherein said submount is formed of a semiconductor material, and wherein said photodetector is a semiconductor photodiode integrally formed with said submount.

4. The laser module of claim 1, wherein said submount is formed of a crystalline silicon material.

5. The laser module of claim 1, wherein said photodetector is configured to receive optical energy from said laser by way of a first waveguide that is integrally formed with said head slider and configured to guide optical energy from said laser through said head slider to said photodetector.

6. The laser module of claim 1, comprising:
   a plurality of photodetector contact pads coupled with said submount and configured to transmit from said photodetector a feedback signal from which the optical energy transmitted through said head slider is computable.

7. The laser module of claim 1, wherein said photodetector is a photodiode array.

8. The laser module of claim 1, wherein said integrally-formed photodetector is a feedback photodetector, said laser module further comprising:
   a back facet photodiode integrally-formed with said submount and configured to directly receive back facet optical energy from said laser from which the optical energy generated by said laser is computable.

9. A heat-assisted magnetic recording (HAMR) head slider assembly comprising:
   a head slider comprising a magnetic write head configured to write to a magnetic-recording disk;
   a laser module comprising:
      a laser, and
      a submount with which said laser is coupled, said submount comprising:
         an aperture positioned on a face of said submount, and
         an integrally-formed photodiode positioned to receive optical energy from said laser which is guided through a feedback waveguide configured to guide optical energy from said laser through said head slider and through said aperture to said photodiode; and
   a HAMR waveguide configured to guide optical energy from said laser through said head slider to near said write head for generating heat in said disk.

10. The HAMR head slider assembly of claim 9, wherein said submount is formed of a semiconductor material, and wherein said photodiode is a semiconductor photodiode integrally formed with said submount.

11. The HAMR head slider assembly of claim 9, wherein said submount is formed of a crystalline silicon material.

12. The HAMR head slider assembly of claim 9, comprising:
  a plurality of photodiode contact pads coupled with said submount and configured to transmit from said photodiode a feedback signal from which the optical energy transmitted through said head slider via said feedback waveguide is computable.

13. The HAMR head slider assembly of claim 9, wherein said integrally-formed photodiode is a feedback photodiode formed at an outer face of said submount, said assembly further comprising:
  a back facet photodiode integrally-formed with said submount and configured to directly receive back facet optical energy from said laser from which the optical energy generated by said laser is computable.

14. The HAMR head slider assembly of claim 13, wherein said feedback photodiode is formed near an interface of said submount and said head slider.

15. The HAMR head slider assembly of claim 9, wherein said photodiode is a photodiode array.

16. A hard disk drive, comprising:
  a magnetic-recording disk rotatably mounted on a spindle;
  a heat-assisted magnetic recording (HAMR) head slider comprising:
    a magnetic write head configured to write to said magnetic-recording disk;
    a laser module comprising:
      a laser, and
      a submount with which said laser is coupled, said submount comprising:
        an aperture positioned on a face of said submount, and
        an integrally-formed photodetector positioned to receive optical energy from said laser which is guided through a feedback waveguide configured to guide optical energy from said laser through said head slider and through said aperture to said photodetector; and
    a HAMR waveguide configured to guide optical energy from said laser through said head slider to near said magnetic write head for generating heat in said magnetic-recording disk; and
  a voice coil motor configured to move said HAMR head slider to access portions of said magnetic-recording disk.

17. The hard disk drive of claim 16, said HAMR head slider comprising:
  said feedback waveguide configured to guide optical energy from said laser through said head slider to said photodetector positioned at an interface of said submount and said HAMR head slider.

18. The hard disk drive of claim 16, wherein said submount is formed of a semiconductor material, and wherein said photodetector is a semiconductor photodiode integrally formed with said submount.

19. The hard disk drive of claim 16, comprising:
  a plurality of photodiode contact pads coupled with said submount and configured to transmit, from said photodiode to a controller, a feedback signal from which the optical energy transmitted through said head slider via said feedback waveguide is computable.

20. The hard disk drive of claim 16, wherein said integrally-formed photodetector is a feedback photodiode formed at an interface of said submount and said HAMR head slider, said hard disk drive further comprising:
  a back facet photodiode integrally-formed with said submount and configured to receive back facet optical energy from which the optical energy emitted by said laser is computable.

* * * * *